(12) United States Patent
Chen et al.

(10) Patent No.: US 7,376,541 B2
(45) Date of Patent: May 20, 2008

(54) ACCURATE PIN-BASED MEMORY POWER MODEL USING ARC-BASED CHARACTERIZATION

(75) Inventors: Jia-Lih J. Chen, Fremont, CA (US);
Naveen Gupta, Fremont, CA (US);
Ghasi R. Agrawal, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 509 days.

(21) Appl. No.: 10/937,049

(22) Filed: Sep. 9, 2004

(65) Prior Publication Data

US 2006/0052996 A1    Mar. 9, 2006

(51) Int. Cl.
*G06F 7/60*        (2006.01)
*G06F 17/50*       (2006.01)
(52) U.S. Cl. ............................... 703/2; 703/14; 703/18
(58) Field of Classification Search ............... 703/14, 703/18, 2
See application file for complete search history.

(56) References Cited

U.S. PATENT DOCUMENTS

| | | | |
|---|---|---|---|
| 5,838,947 A * | 11/1998 | Sarin | 703/14 |
| 6,212,665 B1 | 4/2001 | Zarkesh et al. | 716/4 |
| 6,480,815 B1 | 11/2002 | Olson et al. | 703/14 |
| 6,598,209 B1 | 7/2003 | Sokolov | 716/4 |

* cited by examiner

*Primary Examiner*—Paul Rodriguez
*Assistant Examiner*—Nithya Janakiraman
(74) *Attorney, Agent, or Firm*—Suiter Swantz PC LLO

(57) ABSTRACT

A pin-based memory power modeling method using arc-based characterization includes steps as follows. All power arcs of a memory model are identified and characterized. A power arc is selected from the identified and characterized power arcs. Output bus switching power is computed by removing overlapping power using the selected power arc, and a temporary value for various input ramp times and output loads is derived. Output pin power for the selected power arc is calculated using the temporary value and a ratio of a number of output bits switching over an entire bus width. Switching power for the selected power arc is calculated by a power estimation tool based on port activity and an input intrinsic power value.

7 Claims, 2 Drawing Sheets

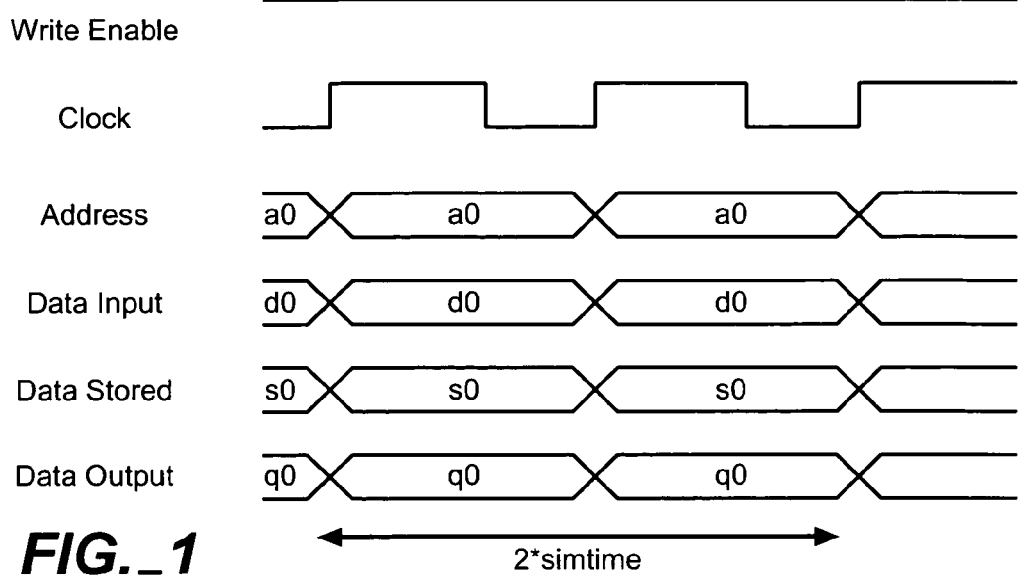
FIG._1
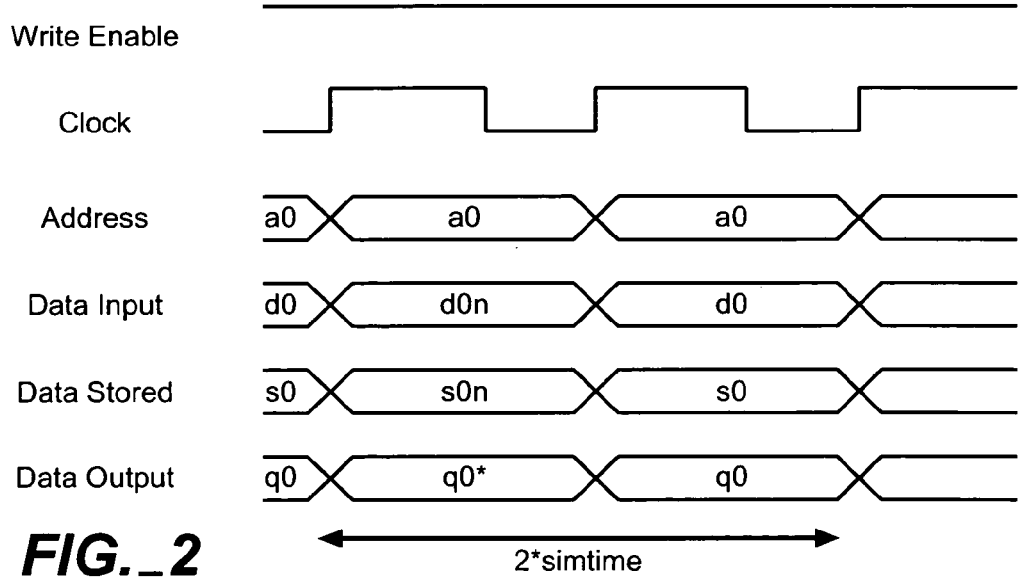
FIG._2
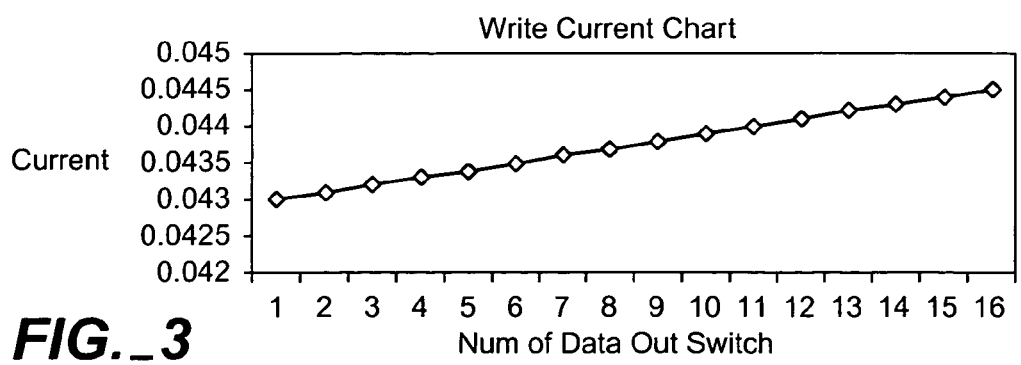
FIG._3

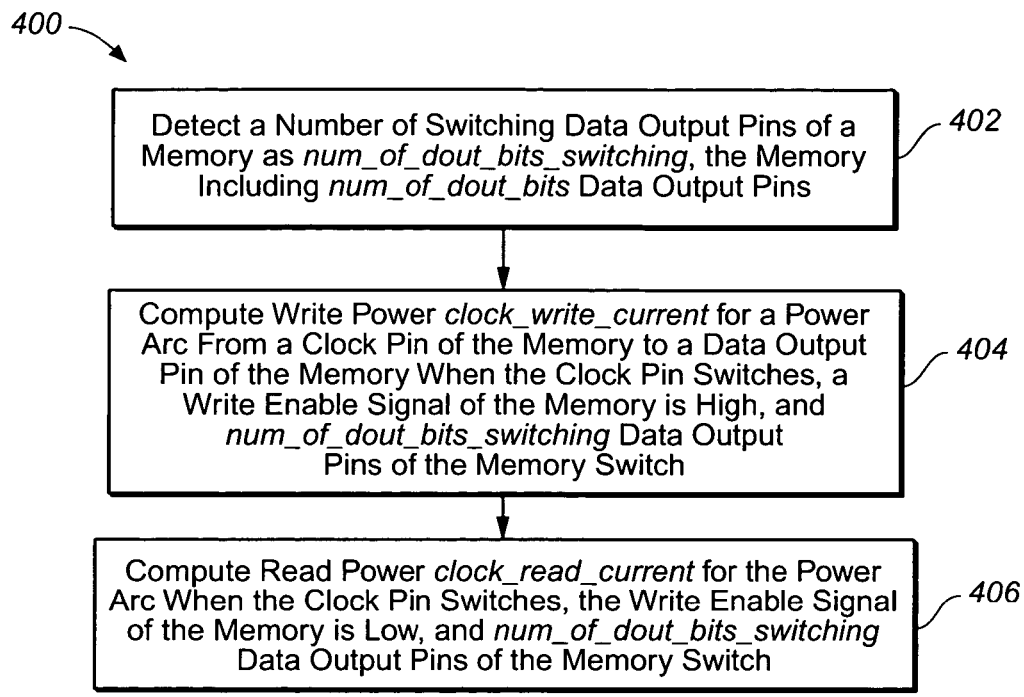
FIG._4
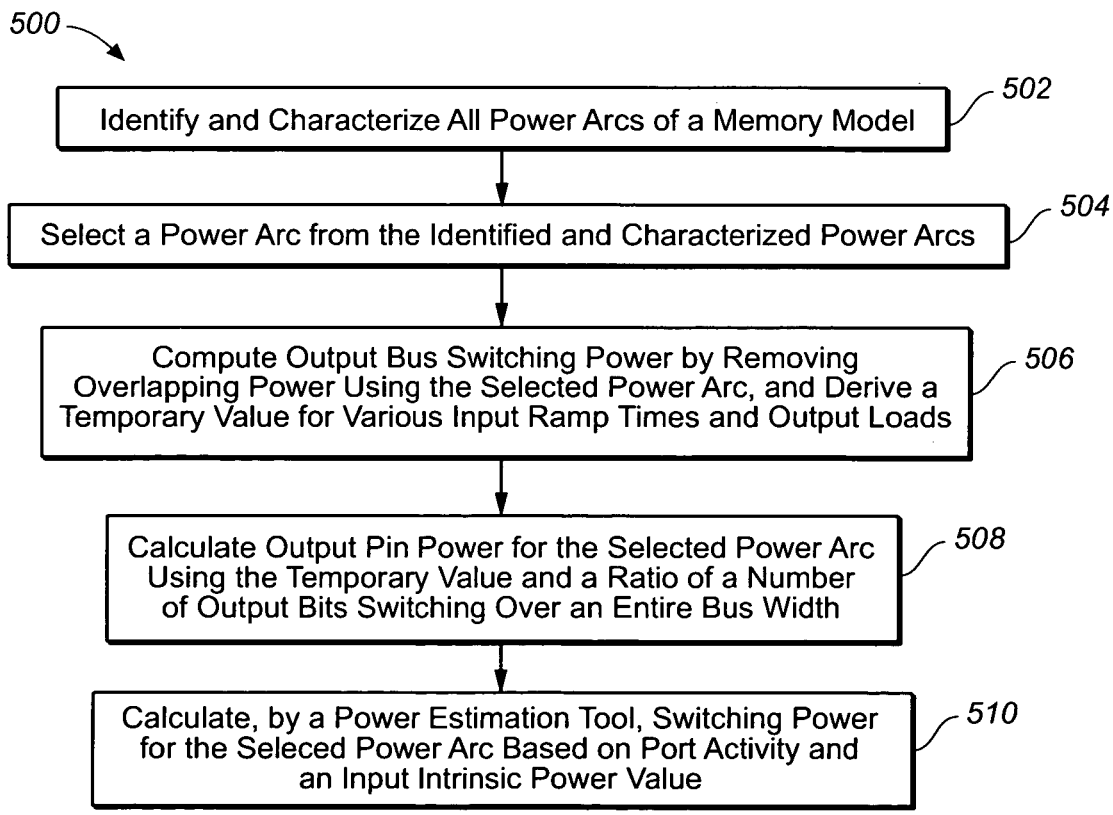
FIG._5

ACCURATE PIN-BASED MEMORY POWER MODEL USING ARC-BASED CHARACTERIZATION

FIELD OF THE INVENTION

The present invention generally relates to the field of integrated circuits, particularly to a method and system of pin-based memory power modeling using arc-based characterization.

BACKGROUND OF THE INVENTION

The advent of wireless and mobile technologies increases the demand for low power integrated circuit designs, particularly for use in battery-powered applications. Because the architectural choices for an integrated circuit (or chip) design often determines its power characteristics, it is becoming imperative to assess the power dissipation level of a chip design at an early stage in the design cycle where significant design changes can still be made to optimize the power characteristics.

In a typical design process of an integrated circuit, the chip design, defined by a functional specification and an interface description, is created using a computer aided design tool and expressed at the register-transfer level (RTL) using a hardware description language (HDL), such as Verilog. HDL describes the chip design in behavior terms and does not include a detailed structural description of the design. When the designer is satisfied with the design at the register-transfer level, the RTL chip design is then synthesized to transform the behavior description into a circuit level or a gate level description. The circuit level or gate level description may be further optimized and verified before the design is transformed into a mask set for manufacturing the integrated circuit.

Generally, a power model of a cell (or a gate) contains one or more descriptions of power dissipating conditions associated with the cell. Two types of cell power models have found widespread use: pin-based and arc-based. Pin-based models describe power dissipation of a cell based on single transitions (switches) on one of the cell's pins, possibly under specific Boolean conditions describing the states of the other pins. The evaluation of the power model involves using the activity values (that is, the switching activity or the duty cycle) of each pin. Arc-based power models describe power dissipation of a cell based on a sequence of events (or logical transitions) on the cell's pins. The sequence of events is usually a transition on an input pin followed by a transition on an output pin, called an arc. Hence, the power model is "arc" based. More complicated arc-based power models may reference a sequence of more than two transitions, or include a Boolean condition describing logical states on the cell's pins during this sequence. The conventional power model uses arc-based power modeling with two kinds of power arcs: the transaction power arc and the intrinsic power arc. With these two kinds of power arcs, the silicon power consumption may be modeled very accurately based on the simulation transaction.

The Liberty library format developed by Synopsys, Inc. is a pin-based modeling technique. However, for the Liberty library format, work has not been done for accurately defining how to characterize (model) memory power for estimation tools. Furthermore, memory power is difficult to model using pin-based characterization. The memory power model is more complex than the macro cells power model due to the structure of multiple input pins and multiple output pins, and because at any time many (any) types of input pins (CLK, Address, Data IN, write enable, etc.) can be active and they all may have some contribution to the overall power dissipation. The conventional memory power model is too simple to correlate with silicon power consumption.

Thus, it is desirable to provide a method and system that characterize and specify the power for each pin in a memory in such a way that they do not overlap with one another so that they can be combined to estimate the power accurately, which method may avoid redundancy caused by simultaneous switching of multiple pins.

SUMMARY OF THE INVENTION

The present invention is directed to a method and system of pin-based memory power modeling using arc-based characterization. The present invention provides a method and system that characterize and specify the power for each pin in a memory in such a way that they do not overlap with one another so that they can be combined to estimate the power accurately. The present method may combine usage of multiple power arcs to define the pin-based power, which ensures that the power overlap among these power arcs is removed. In other words, the present method may avoid redundancy caused by simultaneous switching of multiple pins.

In an exemplary aspect of the present invention, a pin-based memory power modeling method using arc-based characterization includes steps as follows. All power arcs of a memory model are identified and characterized. A power arc is selected from the identified and characterized power arcs. Output bus switching power is computed by removing overlapping power using the selected power arc, and a temporary value for various input ramp times and output loads is derived. Output pin power for the selected power arc is calculated using the temporary value and a ratio of a number of output bits switching over an entire bus width. Switching power for the selected power arc is calculated by a power estimation tool based on port activity and an input intrinsic power value.

In an additional exemplary aspect of the present invention, a pin-based memory power modeling method using arc-based characterization includes steps as follows. The number of switching data output pins of a memory is detected as num_of_dout_bits_switching. The memory includes num_of_dout_bits data output pins. Write power clock_write_current is computed for a power arc from a clock pin of the memory to a data output pin of the memory when the clock pin switches, a write enable signal of the memory is high, and num_of_dout_bits_switching data output pins of the memory switch. The step of computing the Write power clock_write_current may include sub-steps as follows: (a) for the clock pin, providing current consumption icxdnw when the clock pin switches, the write enable signal is high, no data input pin of the memory switches, and none of num_of_dout_bits data output pins of the memory switches; (b) for the data output pin, providing current consumption icxdxw when the clock pin switches, the write enable signal is high, all data input pins of the memory switch, and all num_of_dout_bits data output pins of the memory switch; (c) calculating current consumption w_temp caused by switching of the all num_of_dout_bits data output pins of the memory as: w_temp=icxdxw−icxdnw, and (d) calculating the clock_write_current as: clock_write_current=icxdnw+w_temp*(num_of_dout_bits_switching/num_of_dout_bits). The present method may be applied to other power arcs of the memory such as a power arc from an address pin to a data output pin, a power arc from a data input pin to a data output pin, and the like.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is a schematic diagram illustrating the waveform in computing current consumption icxdnw when a clock switches, a write enable signal is high, no data input pin switches and hence no data output pin switches in accordance with an exemplary embodiment of the present invention;

FIG. 2 is a schematic diagram illustrating the waveform in computing current consumption icxdxw when a clock switches, a write enable signal is high, all data input pins switch and all data output pins switch in accordance with an exemplary embodiment of the present invention;

FIG. 3 shows a chart of Write power clock_write_current for a power arc from a clock pin of a memory to a data output pin of the memory in accordance with an exemplary embodiment of the present invention, where the Write power clock_write_current varies with the number of switching data output pins linearly;

FIG. 4 is a flow diagram of a pin-based memory power modeling method in accordance with an exemplary embodiment of the present invention; and FIG. 5 is a flow diagram of a pin-based memory power modeling method in accordance with another exemplary embodiment of the present invention.

DETAILED DESCRIPTION OF THE INVENTION

Reference will now be made in detail to the presently preferred embodiments of the invention, examples of which are illustrated in the accompanying drawings.

The present invention provides a new pin-based power model using arc-based characterization to accommodate with a pin-based library format such as the Liberty library format, and the like. The present invention characterizes and specifies the power for each pin in a memory in such a way that they do not overlap with each other so that they can be combined to estimate the power accurately. The present invention characterizes the full spectrum of the power arcs from the various input pins to the data output pins.

The detailed description of a pin-based memory power model for a power arc from a clock pin clka to a data output pin dout is in order. However, it is understood that a same or similar pin-based memory power model may be used for other power arcs of the memory and the estimation tool may use the model to estimate the power based on the activity of the corresponding pins without departing from the scope and spirit of the present invention. Those of ordinary skill in the art will understand that the following description may be modified based on the internal architecture and circuit functionality of the memory without departing from the scope and spirit of the present invention.

clk pin to dout pin power arc model (for read-write only ports):

---

```
pin(clka)
{
/*write power*/
when (we) /*write enable is high */
internal_power/*clock switch, output dout not switch*/
input_ramp_time_index
{icxdnw_0, icxdnw_1, icxdnw_2, icxdnw_3, icxdnw_4,
icxdnw_5, icxdnw_6, icxdnw_7, icxdnw_8, icxdnw_9)
/*Can also be defined as input transition time */
Definition of icxdnw: Current consumption when clock is switching, write
enable is high and no data input switching and hence no data output
switching (see FIG. 1 for the corresponding waveform).
/*read power*/
when (!we) /* write enable is low */
internal_power/*clock switch, output dout not switch*/
input_transition_index
{icxqnr_0, icxqnr_1, icxqnr_2, icxqnr_3, icxqnr_4, icxqnr_5,
icxqnr_6, icxqnr_7, icxqnr_8, icxqnr_9}
}
Definition of icxqnr_(n) = Current consumption when clock is switching,
and none of the output data bits are switching.
pin(dout)
{
/*write power*/
when (we)
internal-power/*clock switch, all output switch */
dout_output_load_index_with_clk_input_transition_index
{w_temp_0, w_temp_1,
w_temp_2 . . . w_temp_49)
Definition of w_temp_(n) = icxdxw_(n)-icxdnw_(n)
Definition of icxdxw_(n) = Current consumption when clock is switching
and all data input are switching (see FIG. 2
for the corresponding waveform).
/*read power*/
when (!we)
internal_power/*clock switch, all output switch */
dout_output_load_index_with_clk_input_transition_index
{r_temp_0, r_temp_1, . . . r_temp_49}
}
Definition for r_temp_(n) = icxqxr_(n)-icxqnr_(n);
Definition of icxqxr_(n) = Current consumption when clock is switching,
and all of the output data bits are switching.
```

---

Using the foregoing-described pin-based memory power model for the clka to dout power arc, any power estimation tool may be used to compute Write operation power (or Write power) and Read operation power (or Read power) for the clka to dout power arc.

For the Write power clock_write_current for the clka to dout power arc, based on the simulation transaction, a power estimation tool may detect the number of switching data output bits num_of_dout_bits_switching. Then, the tool may obtain the current consumption icxdnw from the clock pin write power table, and add the interpolated current value based on the all data output bits switch value(w_temp) multiplied by the actual number of switching bits num_of_dout_bits_switching to obtain the Write power clock_write_current. The linear equation is listed as follows $$clock\_write\_current = icxdnw + w\_temp*(num\_of\_dout\_bits\_switching/num\_of\_dout\_bits),$$

where num_of_dout_bits represents the total number of data output pins of the memory.

FIG. 3 shows a chart of Write power clock_write_current for a power arc from a clock pin of a memory to a data output pin of the memory in accordance with an exemplary embodiment of the present invention, where the Write power clock_write_current varies with the number of switching data output pins linearly. As shown in FIG. 3, assuming icxdnw=0.042, num_of_dout_bits=16, num_of_dout_bits_switching=5, icxdxw=0.0445, then clk_dout_write_current=0.042+(0.0445−0.042)*(5/16)=0.0434.

Similarly, the equation for the Read power clock_read_current for the clka to dout power arc is as follows:

clock_read_current=icxqnr+r_temp*(num_of_dout_bits_switching/num_of_dout_bits).

The pin-based power may be modeled in the same or similar way for all other power arcs of the memory, and any estimation tool may use the model to estimate the power based on the activity of the corresponding pins.

FIG. 4 is a flow diagram of a pin-based memory power modeling method 400 in accordance with an exemplary embodiment of the present invention. The method 400 may start with step 402 in which the number of switching data output pins of a memory is detected as num_of_dout_bits_switching The memory includes num_of_dout_bits data output pins. The step 402 may be implemented by a power estimation tool based on simulation.

In step 404, Write power clock_write_current is computed for a power arc from a clock pin of the memory to a data output pin of the memory when the clock pin switches, a write enable signal of the memory is high, and num_of_dout_bits_switching data output pins of the memory switch. The step 404 may include sub-steps as follows: (a) for the clock pin, providing current consumption icxdnw when the clock pin switches, the write enable signal is high, no data input pin of the memory switches, and none of num_of_dout_bits data output pins of the memory switches; (b) for the data output pin, providing current consumption icxdxw when the clock pin switches, the write enable signal is high, all data input pins of the memory switch, and all num_of_dout_bits data output pins of the memory switch; (c) calculating current consumption w_temp caused by switching of the all num_of_dout_bits data output pins of the memory as: w_temp=icxdxw−icxdnw, and (d) calculating the clock_write_current as: clock_write_current=icxdnw+w_temp*(num_of_dout_bits_switching/num_of_dout_bits). The step 404 may further include a sub-step of obtaining the current consumption icxdnw from a clock pin Write power table by a power estimation tool.

In step 406, Read power clock_read_current is computed for the power arc from the clock pin of the memory to the data output pin of the memory when the clock pin switches, the write enable signal of the memory is low, and num_of_dout_bits_switching data output pins of the memory switch. The step 406 may include sub-steps as follows: (a) for the clock pin, providing current consumption icxqnr when the clock pin switches, the write enable signal is low, and none of num_of_dout_bits data output pins of the memory switches; (b) for the data output pin, providing current consumption icxqxr when the clock pin switches, the write enable signal is low, and the all num_of_dout_bits data output pins of the memory switch; (c) calculating current consumption r_temp caused by switching of the all num_of_dout_bits data output pins of the memory as: r_temp=icxqxr−icxqnr, and (d) calculating the clock_read_current as: clock_read_current=icxqnr+r_temp*(num_of_dout_bits_switching/num_of_dout_bits). The step 406 may further include a sub-step of obtaining the current consumption icxqnr from a clock pin Read power table by a power estimation tool.

Those of ordinary skill in the art will understand that the method 400 may be applied to other power arcs of a memory such as a power arc from an address pin to a data output pin, a power arc from a data input pin to a data output pin, and the like without departing from the scope and spirit of the present invention.

FIG. 5 is a flow diagram of a pin-based memory power modeling method 500 in accordance with another exemplary embodiment of the present invention. The method 400 shown in FIG. 4 may be an exemplary embodiment of the method 500. The method 500 may start with step 502 in which all power arcs of a memory model are identified and characterized. A power arc is selected from the identified and characterized power arcs 504. Output bus switching power is computed by removing overlapping power using the selected power arc, and a temporary value for various input ramp times and output loads is derived 506. Output pin power for the selected power arc is calculated using the temporary value and a ratio of a number of output bits switching over an entire bus width 508. Switching power for the selected power arc is calculated by a power estimation tool based on port activity and an input intrinsic power value 510. The input intrinsic power is the switching power of input pins. As an example, the foregoing-described icxdnw is the input intrinsic power since there is no switching for the output. Flowing the step 510, a second power arc may be selected from the identified and characterized power arcs, and the steps 506, 508 and 510 may be repeated for the second selected power arc.

Thus, the present invention provides a new pin-based power modeling technique which any estimation tools may use to accurately estimate the silicon power dissipation of a memory. Using the present invention, the memory power using pin-based format (e.g., Synopsys, Inc.'s Liberty, and the like) may be accurately modeled.

It is to be noted that the above described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of software package. Such a software package may be a computer program product which employs a computer-readable medium including stored computer code which is used to program a computer to perform the disclosed function and process of the present invention. The computer-readable medium may include, but is not limited to, any type of conventional floppy disks, optical disks, CD-ROMS, magneto-optical disks, ROMs, RAMs, EPROMs, EEPROMs, magnetic or optical cards, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A pin-based memory power dissipation determination method using arc-based characterization, comprising steps of:

detecting a number of switching data output pins of a memory as n, said memory including m data output pins; and computing Write power for a power arc from a clock pin of said memory to a data output pin of said memory when said clock pin switches, a write enable signal of said memory is high, and n data output pins of said memory switch, comprising:

for said clock pin, providing first current consumption when said clock pin switches, said write enable signal is high, no data input pin of said memory switches, and none of m data output pins of said memory switches;

for said data output pin, providing second current consumption when said clock pin switches, said write enable signal is high, all data input pins of said memory switch, and all said m data output pins of said memory switch;

calculating third current consumption caused by switching of said all m data output pins of said memory as: said third current consumption=said second current consumption−said first current consumption;

calculating said Write power as: said Write power=said first current consumption +said third current consumption * (said n/said m); and utilizing said Write power to determine a silicon power dissipation for said memory.

2. The pin-based memory power dissipation determination method of claim 1, wherein said step of detecting is implemented by a power estimation tool based on simulation.

3. The pin-based memory power dissipation determination method of claim 1, wherein said step of computing said Write power further comprises obtaining said first current consumption from a clock pin Write power table by a power estimation tool.

4. The pin-based memory power dissipation determination method of claim 1, further comprising a step of:

computing Read power for said power arc when said clock pin switches, said write enable signal of said memory is low, and n data output pins of said memory switch, comprising:

for said clock pin, providing fourth current consumption when said clock pin switches, said write enable signal is low, and none of said m data output pins of said memory switches;

for said data output pin, providing fifth current consumption when said clock pin switches, said write enable signal is low, and said all said m data output pins of said memory switch;

calculating sixth current consumption caused by switching of said all said m data output pins of said memory as: said sixth current consumption=said fifth current consumption−said fourth current consumption; and calculating said Read power as: said Read power= said fourth current consumption +said sixth current consumption * (said n/said m).

5. The pin-based memory power dissipation determination method of claim 4, wherein said step of computing Read power further comprises obtaining said fourth current consumption from a clock pin Read power table by a power estimation tool.

6. The pin-based memory power dissipation determination method of claim 1, further comprising:

computing a second Write power for a second power arc from a pin of said memory to a data output pin of said memory when said pin switches, a write enable signal of said memory is high, and n data output pins of said memory switch, wherein said pin is an address pin or a data input pin of said memory.

7. The pin-based memory power dissipation determination method of claim 6, further comprising:

computing a second Read power for said second power arc when said pin switches, said write enable signal of said memory is low, and said n data output pins of said memory switch.

* * * * *